Dec. 29, 1959        P. H. GARNER        2,919,143
MOUNTING UNIT FOR TRACTOR-CONVEYED IMPLEMENT
Filed April 5, 1956
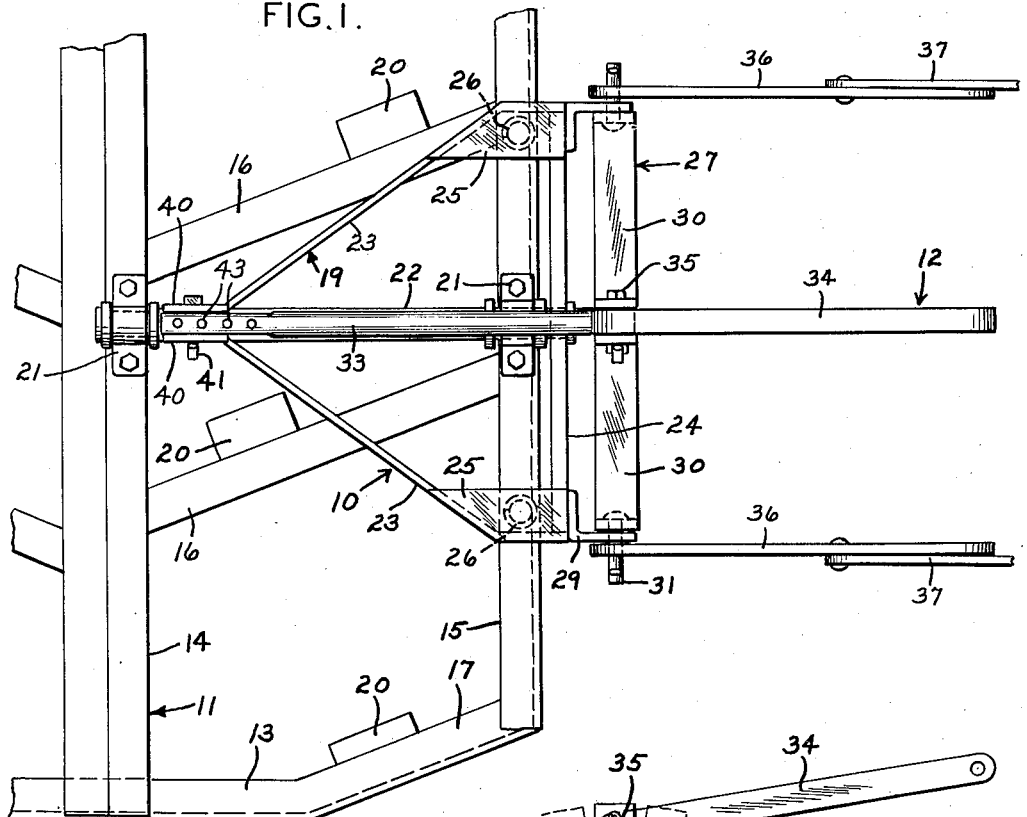
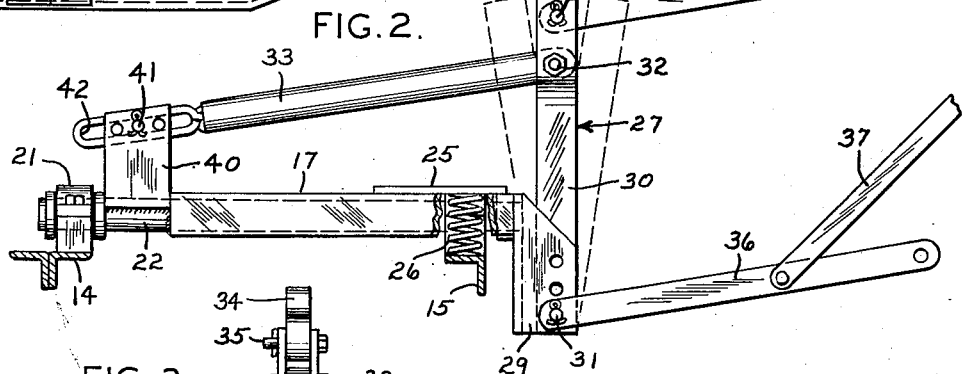
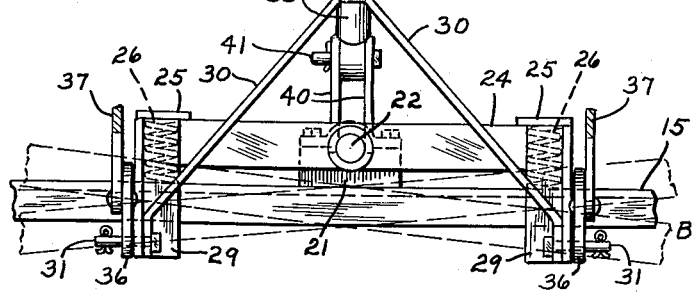
INVENTOR,
PAUL H. GARNER
BY Terry and Cohn
ATTORNEYS.

United States Patent Office 2,919,143
Patented Dec. 29, 1959

2,919,143

MOUNTING UNIT FOR TRACTOR-CONVEYED IMPLEMENT

Paul H. Garner, Picayune, Miss.

Application April 5, 1956, Serial No. 576,460

2 Claims. (Cl. 280—497)

This invention relates to improvements in a mounting unit for an implement adapted to be conveyed by a tractive vehicle, the unit including hitch means for connecting such implement to such vehicle.

Although the subject of this invention is particularly embodied advantageously in an implement such as an offset disc harrow conveyed by a tractive vehicle such as a tractor, it will be understood that the invention is not restricted to this specific usage since the invention is applicable to implements in general which utilize a rigid frame.

An important objective is realized by the provision of a rotatable connection between a rigid implement frame and a hitch frame of a mounting unit which enables relative lateral tilting movement of the frames about such connection while the implement is being conveyed by a tractive vehicle, the tilting movement compensating for uneven ground contour or any unbalanced force applied to the implement frame through the ground-engaging element or elements such as harrow discs.

Another important object is achieved by providing resilient means between the hitch and implement frames mentioned previously which tend to maintain the frames in a predetermined balanced position, and serve to afford a yieldable tilting lateral movement of the frames about the rotatable connection between such frames.

Still another important objective is realized by the pivotal connection of a second hitch frame to the first hitch frame discussed above as being rotatively connected to the implement frame, and by the provision of a rod attached to one of the hitch frames and adjustably connected to the other hitch frame to permit pivotal movement of the second hitch frame, the structural arrangement realizing a permissive adjustment of the force applied to the implement through the rod so as to determine the degree of ground penetration of the disc gangs.

An objective is realized by providing a mounting unit for a tractor-conveyed implement which is simple and durable in construction and economical to manufacture, the mounting unit being adapted for ready attachment to the conventional type of draft-and-lift means usually provided on a tractor.

Yet another important object is realized by a mounting unit for a tractor-conveyed implement having a rigid implement frame, the mounting unit including means rotatably mounting a hitch frame on said implement frame, and including resilient means arranged operatively between said implement and hitch frames, the mounting means permitting relative tilting movement between the frames, and the resilient means tending to maintain the frames in a predetermined balanced position.

The foregoing and numerous other objects and advantages of the invention will more clearly appear from the following detailed description of a preferred embodiment, particularly when considered in connection with the accompanying drawing, in which:

Fig. 1 is a fragmentary, top plan view of the mounting unit shown assembled on the rigid frame of an implement such as a harrow, and showing the connection of such mounting unit to the draft means of a tractor;

Fig. 2 is a side elevational view of the mounting unit with portions cut away to show the arrangement of spring means between the unit and implement frame, the dotted lines showing the range of pivotal movement of a hitch frame, and Fig. 3 is a front elevational view of the mounting unit and implement frame, the dotted lines illustrating the lateral tilting movement of the implement frame relative to the mounting unit.

Referring now by characters of reference to the drawing, the mounting unit generally designated at 10 is particularly adapted for assembly on a rigid frame implement referred to at 11, and adapted to connect such implement to the draft means designated generally at 12 of a tractive vehicle such as a tractor.

The implement shown in the drawing is a harrow having a rigid frame 13 which includes transverse members 14 and 15, and bridging frame members 16 and side frame member 17. A plurality of bearing blocks 20 are carried by bridging and side frame members 16 and 17, the bearing blocks 20 being arranged to carry and locate disc gangs which are not shown for purposes of clarity in illustrating the connection of mounting unit 10 on implement frame 13.

The mounting unit 10 includes a pair of pillow block bearings 21, one being fastened and carried by frame member 14 and one by frame member 15. These block bearings 21 journal a rotatable frame element 22 constituting a shaft that is arranged endwise of implement frame 13 in a fore and aft direction and aligned axially in the direction of pull. For reasons which will later appear, the bearings 21 maintain shaft 22 above and in spaced relation to the implement frame 13.

A hitch frame generally indicated at 19, constituting a component part of the mounting unit, includes rearwardly converging side arms 23 that have their rear end portions fastened to shaft 22, and includes a cross bar 24 that bridges and connects the forward end portions of arms 23. The forward end of shaft 22 is fixed as by welding to cross bar 24. Thus it is seen that this hitch frame 19 is allowed to tilt laterally about the axis defined by shaft 22 with respect to the implement frame 13.

Resilient means is provided between the above described hitch frame 19 and the implement frame 13 so that such frames are usually maintained in a predetermined balanced position as is shown in full lines in the drawing. Fixed to arms 23 and cross bar 24 at each side of shaft 22 is a gusset plate 25, the gusset plates 25 immediately overlying in vertically spaced position the frame member 15 of implement frame 13. A compression spring 26 is located between frame member 15 and each gusset plate 25, the springs 26 tending to maintain the hitch frame 19 in balanced relation to implement frame 13 as shown in full lines in Fig. 3. Of course, springs 26 will permit under spring loading, relative lateral tilting movement of such frames 19—13, as suggested in dotted lines in Fig. 3.

In addition, the mounting unit 10 includes means for connecting the unit to draft means 12. This connecting means includes a second hitch frame 27 having upwardly converging arms 30. The lower end portion of each arm 30 is pivotally connected by pin 31 to a front frame member 29 fixed to cross bar 24 of the first described hitch frame 19. The upper end portions of arms 30 extend above shaft 22 and are connected by pin 32 to the forward end of rod 33.

The draft means 12 is of conventional type and includes a link 34 pivotally connected by pin 35 to the uppermost portion of arms 30, side links 36 pivotally connected to front frame members 29 and arms 30 by pivot pins 31, and actuating elements 37 pivotally connected to side links 36 and adapted to raise and lower the mounting unit and implement frame through such linkage.

Fixed to one end of shaft 22 at the rear of converging hitch arms 23 is a pair of upstanding plates 40 spaced apart to receive the rear end of rod 33. A pin 41 is carried by plates 40 and is received in elongate slot 42 formed in the rear end of rod 33, the pin 41 being relatively slidable within predetermined limits defined by slot 42 to permit pivotal movement of second hitch frame 27. If it is desired to fix rod 33 to plates 40, and hence fix the position of second hitch frame 27, a pair of retaining pins (not shown) may be located on opposite sides of connecting pin 41 in any pair of apertures 43 formed in rod 33. This selective adjustment of the effective length of rod 33 enables an adjustment of the force applied to the implement 11 through rod 33 to determine the degree of ground penetration of the disc gangs.

In operation with the mounting unit 10 connected to the draft means 12 of a tractor, when the disc gangs of the implement frame encounter uneven ground contour or when any unbalanced force is applied to the implement frame through the ground-engaging elements, the implement frame 13 is permitted to tilt laterally under loading of springs 26 in order to compensate for such conditions and to relieve any undue stress on the draft means 12 and their connection to the mounting unit 10.

Moreover, when pin 41 is freely movable in elongate slot 42, the implement frame is adjustable in position about pivot pin 31 to compensate for the above described ground and unbalanced force conditions. However, as described above, the effective length of rod 33 may be fixed selectively by definitely locating the position of pin 41 in slot 42 through the use of retaining pins (not shown) and apertures 43. In this event a predetermined force may be applied to implement frame 13 through rod 33 to determine the extent of ground penetration by the disc gangs.

Although the invention has been described by making detailed reference to a single preferred embodiment, such detail is to be understood in an instructive, rather than in any restrictive sense, many variants being possible within the scope of the claims hereunto appended.

I claim as my invention:

1. A mounting unit for a tractor-conveyed implement having a rigid frame, the implement frame having a front transverse member, the unit comprising a first hitch frame supported by said implement frame, the first hitch frame consisting of an A frame having rearwardly converging arms and a bridging bar, a shaft having one end fixed rigidly to said bar and the other end fixed rigidly to said arms, means rotatively mounting said shaft to said transverse member and to the implement frame at the rear of said member, said shaft being disposed in a fore and aft direction and permitting only a relative lateral tilting movement on said first hitch frame and said implement frame about the rotative axis of said shaft, spring means disposed between said implement frame and said first hitch frame on each side of said shaft tending to maintain said first hitch frame in a predetermined balanced position, a second hitch frame having upwardly converging arms, means pivotally connecting the arms of said second hitch frame to the arms of said first hitch frame about a transverse axis at right angles to the rotative axis of said shaft, a rod having one end connected to the second hitch frame above said pivot means and having the other end connected to said first hitch frame rearwardly of said pivot means, the connection between the rod and first hitch frame being slidable to permit pivotal movement of said second hitch frame, the rod being disposed in a fore and aft direction in a vertical plane with the axis of said shaft.

2. The combination and arrangement of elements as recited above in claim 1, but further characterized in that the connection between the rod and first hitch frame consists of an upstanding frame element rigidly attached on said first hitch frame, the rod being provided with an elongate slot, and a connecting pin carried by said frame element and extending through said slot, the pin being relatively slidably movable in said slot to determine the range of pivotal movement of said second hitch frame, and means on said rod for fixing the pin in a predetermined location within said slot so as to exert a predetermined force on the implement frame through the first hitch frame and said shaft.

References Cited in the file of this patent

UNITED STATES PATENTS

| | | |
|---|---|---|
| 882,379 | Gilbreath | Mar. 17, 1908 |
| 2,273,875 | Livesey et al. | Feb. 24, 1942 |
| 2,456,693 | Fraga | Dec. 21, 1948 |
| 2,640,405 | Wheeler | June 2, 1953 |
| 2,656,776 | Cox et al. | Oct. 27, 1953 |

FOREIGN PATENTS

| | | |
|---|---|---|
| 166,675 | Australia | Jan. 25, 1956 |